(12) United States Patent
Betz

(10) Patent No.: US 9,292,509 B2
(45) Date of Patent: *Mar. 22, 2016

(54) SUPPLEMENTING SEARCH RESULTS WITH INFORMATION OF INTEREST

(71) Applicant: Google Inc., Mountain View, CA (US)

(72) Inventor: Jonathan Betz, Summit, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,898

(22) Filed: Aug. 8, 2014

(65) Prior Publication Data

US 2015/0169564 A1    Jun. 18, 2015

Related U.S. Application Data

(63) Continuation of application No. 13/615,917, filed on Sep. 14, 2012, now Pat. No. 8,805,872, which is a continuation of application No. 12/109,193, filed on Apr. 24, 2008, now Pat. No. 8,510,325, which is a continuation-in-part of application No. 11/024,784, filed on Dec. 30, 2004, now abandoned.

(51) Int. Cl.
   *G06F 17/30*   (2006.01)

(52) U.S. Cl.
   CPC .... *G06F 17/30011* (2013.01); *G06F 17/30867* (2013.01); *G06F 17/30424* (2013.01); *G06F 17/30554* (2013.01)

(58) Field of Classification Search
   CPC ................... G06F 17/30398; G06F 17/30554; G06F 17/30424; G06F 17/30011; G06F 17/30867

USPC ......................................................... 707/769
See application file for complete search history.

(56) References Cited

U.S. PATENT DOCUMENTS

| | | | |
|---|---|---|---|
| 5,875,446 A * | 2/1999 | Brown et al. | |
| 5,890,172 A * | 3/1999 | Borman et al. | ............... 715/205 |
| 6,014,665 A | 1/2000 | Culliss | |
| 6,266,649 B1 | 7/2001 | Linden et al. | |
| 6,345,273 B1 | 2/2002 | Cochran | |
| 6,356,899 B1 | 3/2002 | Chakrabarti et al. | |
| 6,363,377 B1 * | 3/2002 | Kravets et al. | |
| 6,385,602 B1 | 5/2002 | Tso et al. | |
| 6,434,556 B1 * | 8/2002 | Levin et al. | |
| 6,567,846 B1 | 5/2003 | Garg et al. | |
| 6,693,651 B2 | 2/2004 | Biebesheimer et al. | |
| 6,704,726 B1 | 3/2004 | Amouroux | |
| 6,763,351 B1 | 7/2004 | Subramaniam et al. | |
| 6,853,982 B2 | 2/2005 | Smith et al. | |
| 7,194,684 B1 | 3/2007 | Shazeer | |
| 7,299,222 B1 * | 11/2007 | Hogan et al. | |

(Continued)

OTHER PUBLICATIONS

Gigablast, http://www.gigablast.com, Dec. 30, 2004 (print date) 3 pages.

(Continued)

*Primary Examiner* — Thanh-Ha Dang
(74) *Attorney, Agent, or Firm* — Fish & Richardson P.C.

(57) ABSTRACT

A system may receive a search query. The system may further provide a list of first documents relating to the search query in a first area of a user interface and provide additional information that has been retrieved from the first documents in a second, different area of the user interface. The additional information includes an attribute name and an associated attribute value.

20 Claims, 9 Drawing Sheets

(56) References Cited

U.S. PATENT DOCUMENTS

| | | |
|---|---|---|
| 7,426,687 B1 | 9/2008 | Schultz et al. |
| 7,437,358 B2 * | 10/2008 | Arrouye et al. |
| 7,792,821 B2 | 9/2010 | Shakib et al. |
| 8,301,614 B2 | 10/2012 | Kraft et al. |
| 8,473,855 B2 * | 6/2013 | Hogan et al. ............ 715/764 |
| 8,510,325 B1 | 8/2013 | Betz |
| 8,805,872 B1 | 8/2014 | Betz |
| 2001/0044758 A1 | 11/2001 | Talib et al. |
| 2002/0198869 A1 * | 12/2002 | Barnett ............ 707/3 |
| 2003/0097357 A1 * | 5/2003 | Ferrari et al. ............ 707/3 |
| 2003/0217335 A1 | 11/2003 | Chung et al. |
| 2004/0162815 A1 | 8/2004 | Irle et al. |
| 2005/0154718 A1 * | 7/2005 | Payne et al. ............ 707/3 |
| 2005/0203918 A1 | 9/2005 | Holbrook |
| 2005/0251513 A1 | 11/2005 | Tenazas |
| 2006/0085741 A1 * | 4/2006 | Weiner et al. ............ 715/517 |
| 2006/0155693 A1 | 7/2006 | Chowdhury et al. |
| 2006/0265417 A1 | 11/2006 | Amato et al. |
| 2007/0005686 A1 | 1/2007 | Fish et al. |
| 2008/0049971 A1 | 2/2008 | Ramos et al. |
| 2008/0133479 A1 | 6/2008 | Zelevinsky et al. |
| 2009/0157711 A1 | 6/2009 | Baer et al. |
| 2011/0040622 A1 | 2/2011 | Lucovsky et al. |
| 2012/0045089 A1 | 2/2012 | Ramos et al. |

OTHER PUBLICATIONS

Co-Pending U.S. Appl. No. 11/024,784 entitled "Supplementing Search Results with Information of Interest", by Betz, filed Dec. 30, 2004, 41 pages.

Plaisant et al., "Interface and Data Architecture for Query Preview in Networked Information Systems", ACM Transactions on Information Systems, vol. 17, No. 3, Jul. 1999, pp. 320-341.

* cited by examiner

ADVERTISEMENT

Company A

Profile
check whether you know these
Background
detailed information about Company A
Products
check out these products
Related Sites

PROFILE

| NAME: | COMPANY A |
| --- | --- |
| CITY: | SANTA CLARA |
| STATE: | CALIFORNIA |
| DATE OF INCORP: | DECEMBER 2, 1981 |
| FOUNDERS: | JACK SMITH, BOB WEI |
| PRODUCT LINE: | WIDGETS |
| 2006 REVENUE: | $1,000,000 |

{ 510

BACKGROUND

Company A is located in Santa Clara, California in 1981. A little known

Google™

Company A  [SEARCH]

RELATED INFORMATION — 910

| NAME | COMPANY A | www.companya.com, www.tcus.org |
|---|---|---|
| DATE OF INCORP | DECEMBER 2, 1981 | www.companya.com |
| FOUNDERS | JACK SMITH, BOB WEI | www.companya.com |
| PRODUCT LINE | WIDGETS | www.companya.com |
| 2006 REVENUE | $1,000,000 | |

SEARCH RESULTS — 920

COMPANY A :: The Official Web Site
The Official Web Site of Company A. The number one maker of widgets in the world.
... ALL RIGHTS RESERVED. Powered by Webmaster. ...
www.companya.com/ - 40k - Dec 16, 2004 - Cached - Similar pages

LOCAL COMPANIES – SANTA CLARA
We provide information on companies located in Santa Clara, California. You may
search by category or query our database ...
www.localsearch.com/ - 8k - Cached - Similar pages

TOP COMPANIES IN THE US
Detailed information on the top 100 companies in the United States, including
information relating to each company's products and/or services. ...
www.tcus.org/ - 84k - Dec 16, 2004 - Cached - Similar pages

SUPPLEMENTING SEARCH RESULTS WITH INFORMATION OF INTEREST

RELATED APPLICATION

This application is a Continuation of U.S. patent application Ser. No. 13/615,917 (now U.S. Pat. No. 8,805,872), filed Sep. 14, 2012, which is a Continuation of U.S. patent application Ser. No. 12/109,193 (now U.S. Pat. No. 8,510,325), filed Apr. 24, 2008, which is a Continuation-in-Part of U.S. patent application Ser. No. 11/024,784, filed Dec. 30, 2004. The entire contents of these applications are incorporated by reference herein.

FIELD OF THE INVENTION

Implementations consistent with the principles of the invention relate generally to providing items, and more specifically, to supplementing provided items with information of interest.

BACKGROUND OF THE INVENTION

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (e.g., in a search query provided by the user). The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links.

In an attempt to increase the relevancy and quality of the web pages returned to the user, a search engine may attempt to sort the list of hits so that the most relevant and/or highest quality pages are at the top of the list of hits returned to the user. For example, the search engine may assign a rank or score to each hit, where the score is designed to correspond to the relevance or importance of the web page. The user may then manually select web pages in the returned list to determine if the web pages contain the information that they are seeking. In some instances, this can be a time consuming endeavor.

SUMMARY OF THE INVENTION

In accordance with one implementation consistent with the principles of the invention, a method includes receiving a search query, providing a list of first documents relating to the search query in a first area of a user interface, and providing additional information that has been retrieved from the first documents in a second, different area of the user interface. The additional information includes an attribute name and an associated attribute value.

In another implementation consistent with the principles of the invention, a method for processing a search query is provided. The method may include identifying a group of first documents based on the search query; obtaining a group of attribute name and attribute value pairs that occur in the first documents; selecting attribute name and attribute value pairs from the group of attribute name and attribute value pairs based on a threshold; and providing a user interface. The user interface may include a list based on the identified first documents and including the selected attribute name and attribute value pairs.

BRIEF DESCRIPTION OF THE DRAWINGS

The accompanying drawings, which are incorporated in and constitute a part of this specification, illustrate an implementation of the invention and, together with the description, explain the invention. In the drawings.

FIG. 5 is an exemplary document that may be included in a repository of documents in an implementation consistent with the principles of the invention;

FIG. 9 is an exemplary graphical user interface that may be provided to a user in one implementation consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Overview

Figure 1:
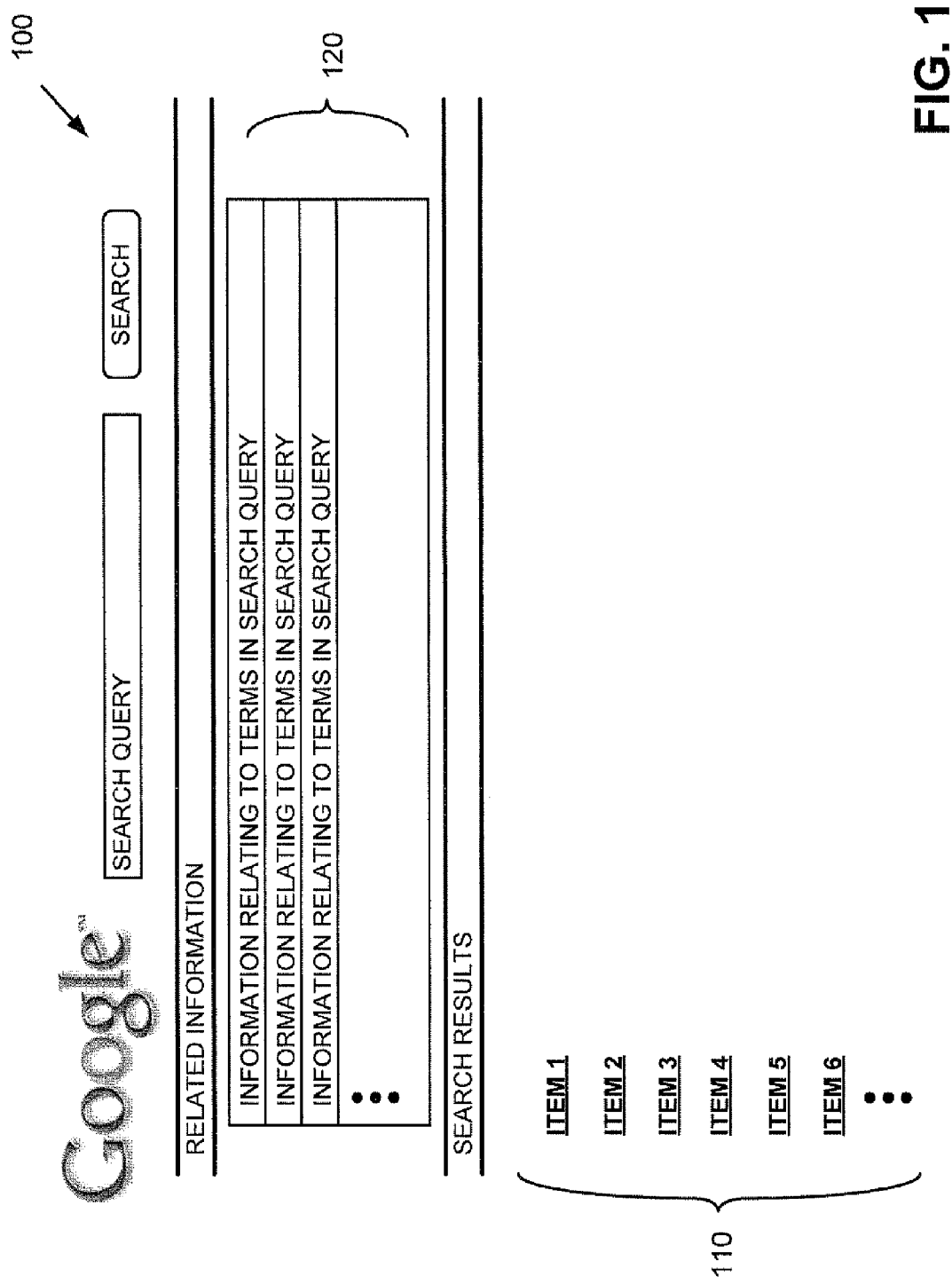
FIG. 1 is an exemplary diagram of a graphical user interface that may be provided to a user in an implementation consistent with the principles of the invention.

Systems and methods consistent with the principles of the invention may provide useful information, in addition to search results, in response to a user conducting a search. FIG. 1 is an exemplary diagram of a graphical user interface 100 that may be provided to a user in an implementation consistent with the principles of the invention. As illustrated in FIG. 1, a user may enter a search query into a search engine in a well known manner. In response, the search engine may obtain a set of documents relating to the search query and provide those documents to the user as a set of search results 110. The search engine may also identify and obtain additional information 120 from the documents that may relate to the search query and provide that additional information 120 to the user.

As an example, assume that a user enters the search query "President George Washington" into a search engine. The search engine may provide a list of documents 110 that relate to the search query (i.e., documents about or that mention President George Washington). In an implementation consistent with the principles of the invention, the search engine may provide additional information 120, including only publicly-available information, relating to President George Washington. For example, the additional information 120 may include, for example, information regarding his date of birth, place of birth, zodiac sign, eye color, hair color, hometown, favorite color, height, weight, and/or other information that has been obtained from publicly-available documents relating to President George Washington. A user performing a search for "President George Washington" may be interested in this additional information and, therefore, may avoid having to sort through the search results to find this information.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary System

Figure 2:
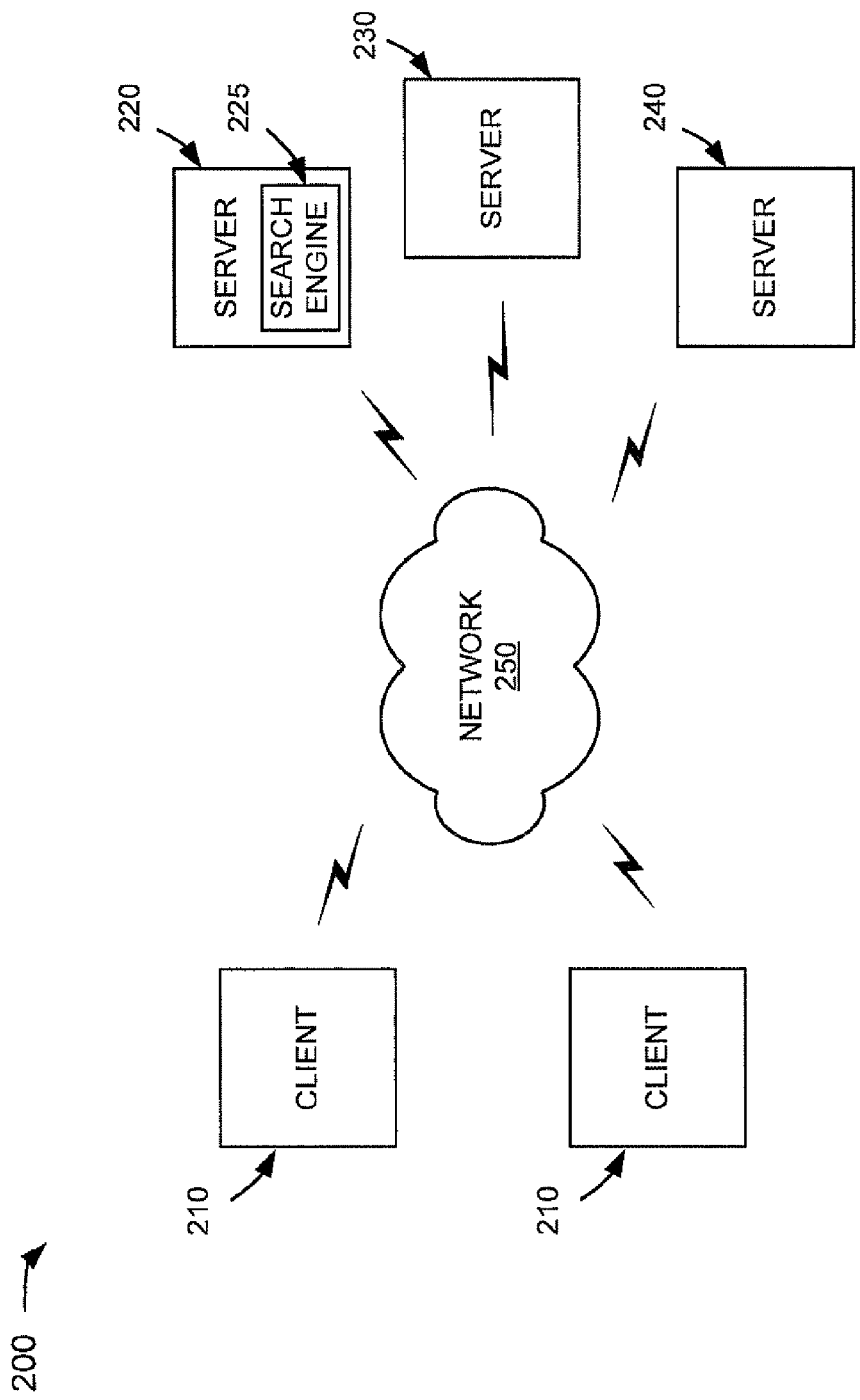
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform some functions of a server and a server may perform some functions of a client.

Clients 210 may include client entities. A client entity may be defined as a device, such as a wireless telephone, a personal computer, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search engine 225 usable by clients 210. Server 220 may crawl a corpus of documents (e.g., web documents), index the documents, and store information associated with the documents in a repository of documents. Servers 230 and 240 may store or maintain documents that may be crawled or analyzed by server 220.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, a memory device, or a combination of networks. Clients 210 and servers 220-240 may connect to network 250 via wired, wireless, and/or optical connections.

Exemplary Client/Server Configuration

Figure 3:
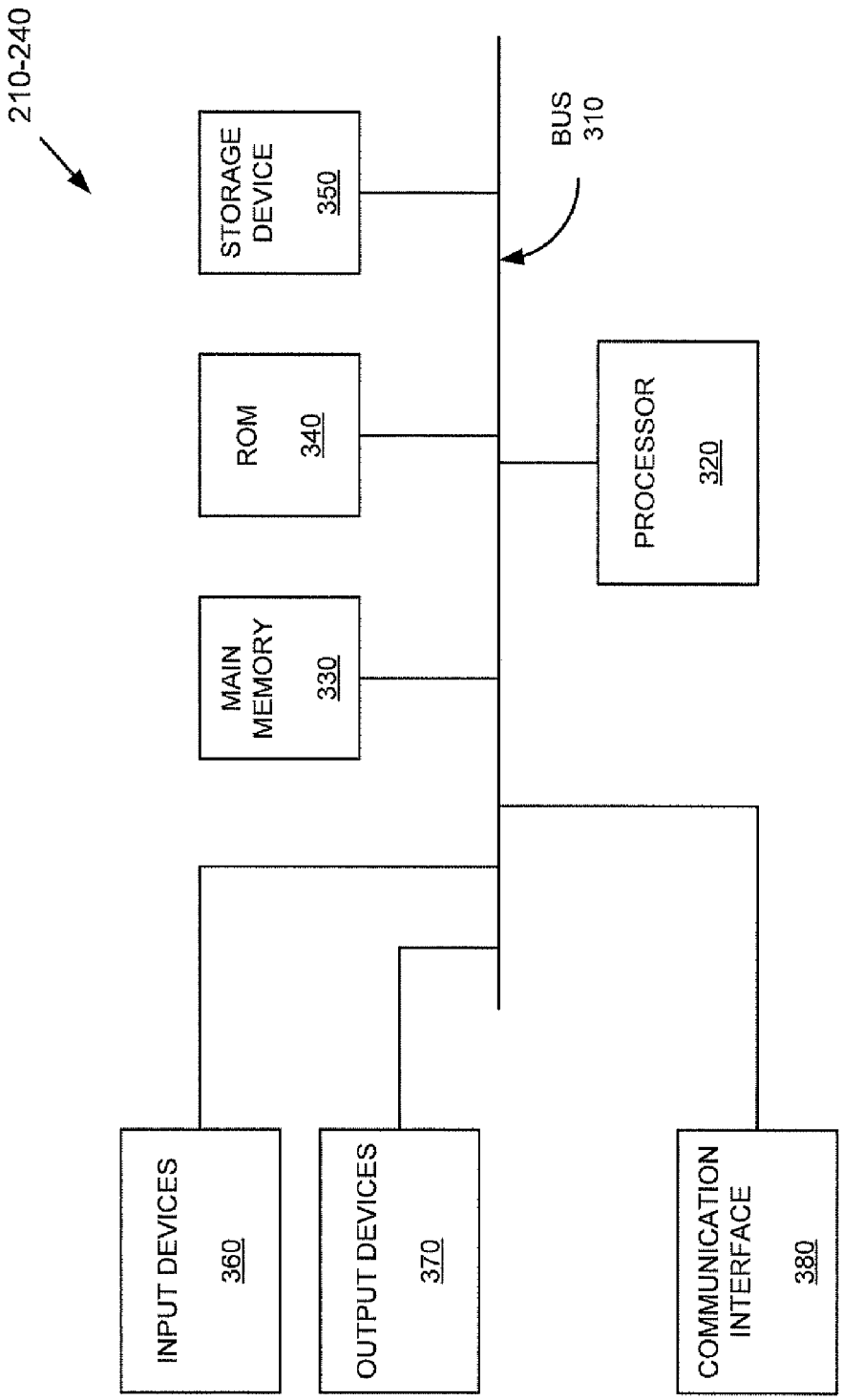
FIG. 3 is an exemplary diagram of a client or server entity according to an implementation consistent with the principles of the invention.

FIG. 3 is an exemplary diagram of a client or server entity (hereinafter called "client/server entity"), which may correspond to one or more of clients 210 and/or servers 220-240, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that interprets and executes instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain document processing-related operations. The client/server entity may perform these operations in response to processor 320 executing software instructions contained in a computer-readable medium, such as memory 330. A computer-readable medium may be defined as a physical or logical memory device.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 4:
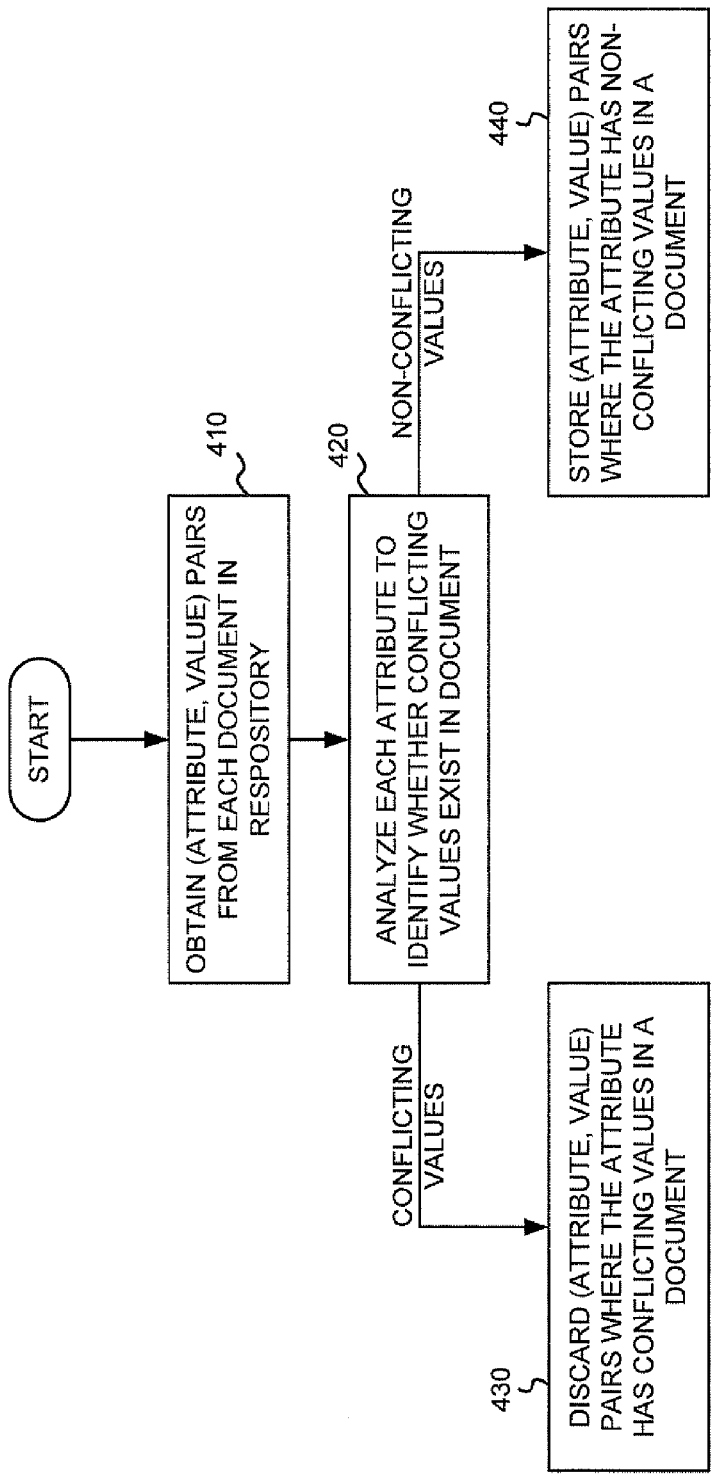
FIG. 4 is a flow chart of an exemplary process for extracting information from a repository of documents in an implementation consistent with the principles of the invention.

FIG. 4 is a flow chart of an exemplary process for extracting information from a repository of publicly-available documents in an implementation consistent with the principles of the invention. The repository of publicly-available documents may be stored at server 220 and may include documents that have been crawled by server 220.

Processing may begin by obtaining (attribute, value) pairs from each document in the repository of documents (act 410). An example of an attribute that may be found in a document may include "date of incorporation." The value associated with that attribute may include a date, such as Mar. 31, 1973. Therefore, act 410 would result in the following (attribute, value) pair being obtained from the document—(date of incorporation, Mar. 31, 1973).

In one implementation consistent with the principles of the invention, (attribute, value) pairs of a document are obtained by identifying predetermined sections of the document. For example, any section of the document that contains a two-column table or a series of lines that follow the pattern "<BR> (attribute text):(value text)<BR>" may be determined to contain an (attribute, value) pair, where <BR> indicates that a carriage return is to be inserted into the document. When a two-column table is identified in a document, it may be assumed, in one implementation consistent with the principles of the invention, that the left-hand column includes the attribute name and that the right-hand column includes the value. In this manner, (attribute, value) pairs may be identified in a document. Other techniques for identifying (attribute, value) pairs may alternatively be used.

To minimize redundancy and improve value certainty checking, attribute names and values may be normalized. For example, the attribute names "date of incorp," "incorporation date," and "date of incorporation" may be considered to be synonymous. Therefore, the occurrence of these attribute names may be normalized, for example, to "date of incorporation." Similarly, dates appear on the Internet in a variety of formats. For example, "Oct. 31, 1966," "31 Oct. 1966," "Oct. 31, 1966," "10/31/66," "10/31/1966," "10-31-66," and "10-31-1966" are just some examples as to how the same date could appear in different formats. In one implementation consistent with the principles of the invention, the occurrence of a date is normalized to a particular format, such as "Month Day, Year." As another example, different variations in place names may also be normalized. For example, "Oakmont, Pennsylvania" may appear as "Oakmont, Pa.," "Oakmont, Pa.," or "Oakmont, Pa., USA." These different variations may be normalized so as to minimize redundancy and improve value certainty checking.

One additional example of where normalizing can be applied involves numeric values, which may be presented with varying degrees of approximation. For example, the population of the United States may be reported as 300 million, 290 million, or 290,342,554. Implementations consistent with the principles of the invention may normalize these values to, for example, 290 million.

FIG. 5 is an exemplary document 500 that may be included in the repository of documents. In this example, document 500 includes information about Company A. As illustrated in FIG. 5, document 500 includes a two-column table 510 under the profile section. In one implementation consistent with the principles of the invention, the (attribute, value) pairs in table 510 may be obtained from document 500. Therefore, the following (attribute, value) pairs may be obtained from document 500: (name; Company A), (city; Santa Clara), (state; California), (date of incorp; Dec. 2, 1981), (founders; Jack Smith, Bob Wei), (product line; widgets), and (2006 revenue; $1,000,000).

For each document in the repository, the attributes for the document may be analyzed to determine whether conflicting values exist in the document (act 420, FIG. 4). For example, assume that for one particular document, the attribute "date of incorporation" exists. Assume further that the document includes the following two values for this attribute: "Oct. 31, 1966" and "Nov. 29, 2002." Therefore, for the attribute "date of incorporation," conflicting values exist in the document.

If an attribute is determined to be associated with conflicting values in a document, the (attribute, value) pairs containing the attribute may be discarded (act 430). If an attribute is not determined to be associated with conflicting values, the (attribute, value) pair containing the attribute may be stored in a computer-readable medium, such as, for example, memory 330 (act 440). In one implementation, the (attribute, value) pair is stored in memory 330 based on an identifier associated with the document from which the (attribute, value) pair is obtained.

Figure 6:
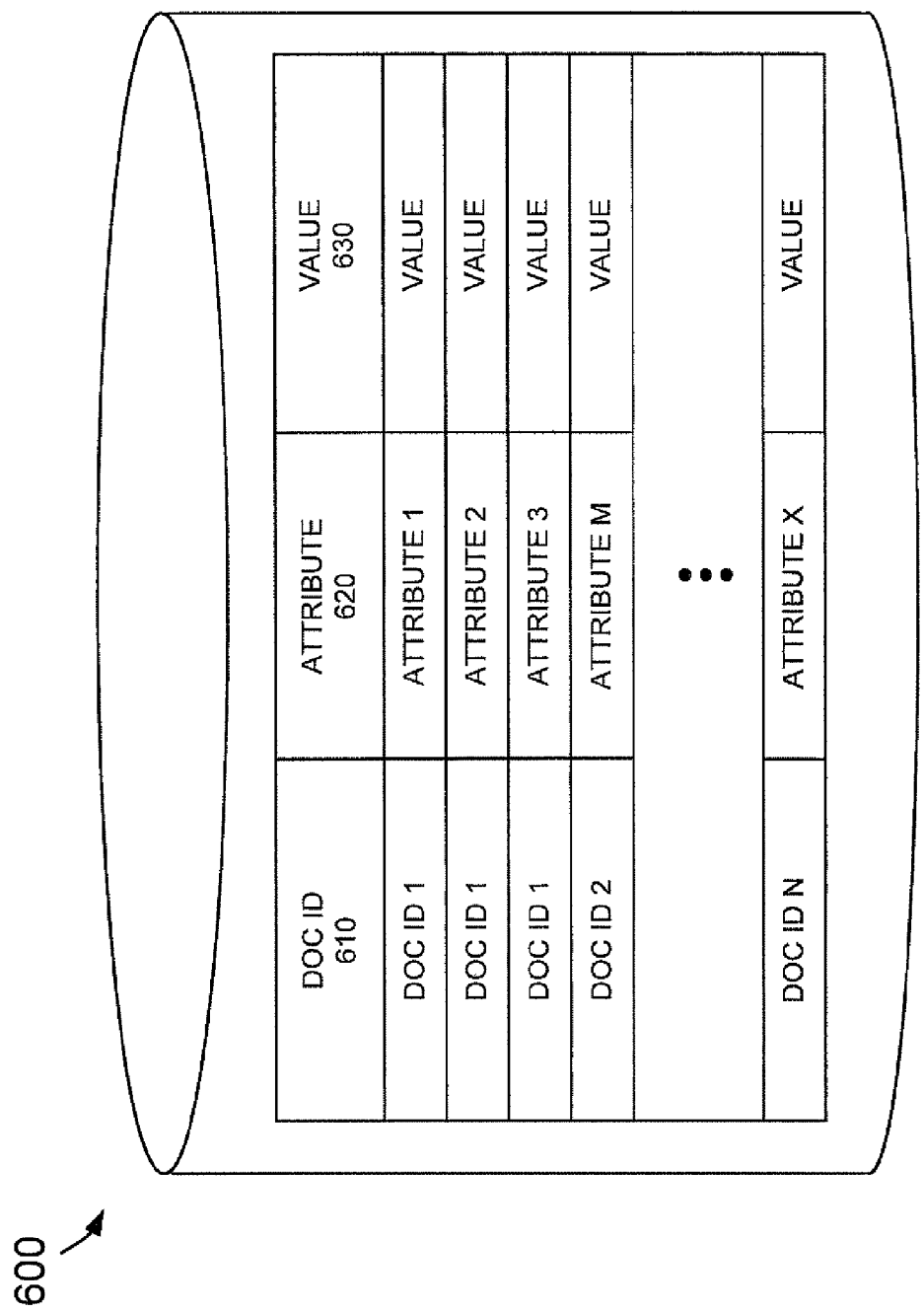
FIG. 6 is an exemplary diagram of a computer-readable medium in an implementation consistent with the principles of the invention.

FIG. 6 is an exemplary diagram of a computer-readable medium 600 in an implementation consistent with the principles of the invention. It will be appreciated that computer-readable medium 600 may be stored locally at server 220 or externally to server 220.

As illustrated, computer-readable medium 600 may include a document identification (DOC ID) field 610, an attribute field 620, and a value field 630. It will be appreciated that computer-readable medium 600 may include more or fewer fields than those illustrated in FIG. 6.

Document identification field 610 may store information that identifies a document in the repository of crawled documents. In one implementation, each document in the repository of crawled documents may be associated with a unique identifier. This unique identifier may be stored in document identification field 610. Attribute field 620 may store an attribute that has been obtained from the document identified in document identification field 610. Value field 630 may store the value associated with an attribute identified in attribute field 620. In this way, (attribute, value) pairs for a document may be stored in computer-readable medium 600. For example, assume that document 500, illustrated in FIG. 5, has a document identifier of ABC. Document identifier ABC may then be associated with the following attributes and values in computer-readable medium 600: (name; Company A), (city; Santa Clara), (state; California), (date of incorp; Dec. 2, 1981), (founders; Jack Smith, Bob Wei), (product line; widgets), and (2006 revenue; $1,000,000).

Figure 7:
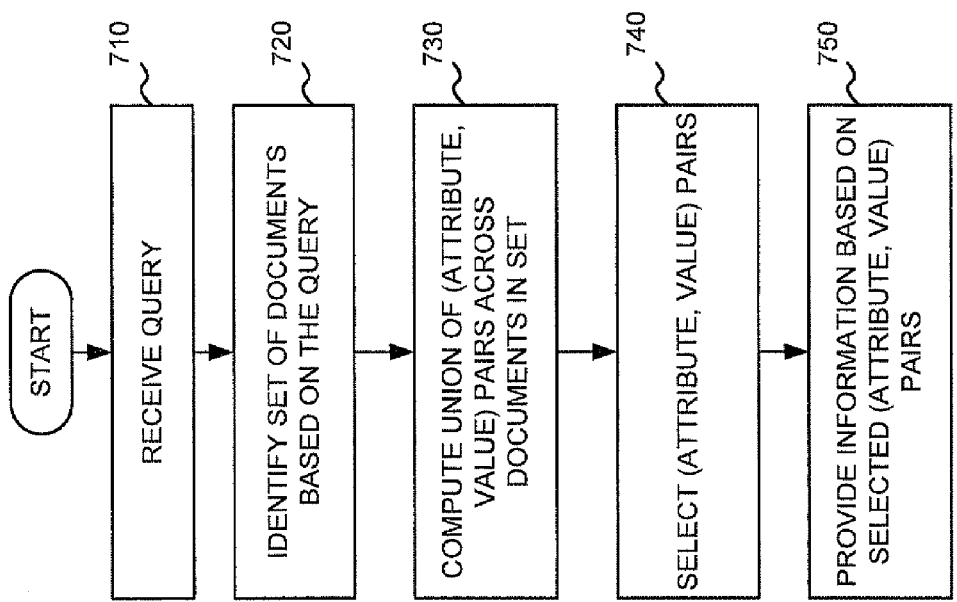
FIG. 7 is an exemplary flowchart of an exemplary process for providing information related to a search query in an implementation consistent with the principles of the invention.

FIG. 7 is an exemplary flowchart of an exemplary process for providing information related to a search query in an implementation consistent with the principles of the invention. Processing may begin with a user providing a search term (or a group of search terms) as a search query for searching a document repository (act 710). In one implementation, the document repository includes documents available from the Internet and/or a database (or set of databases) and the vehicle for searching this repository is a search engine, such as search engine 225 (FIG. 2). The user may provide the search query via web browser software on a client, such as client 210 (FIG. 2).

The search query may be received by the search engine and used to identify documents related to the search query (act 720). A number of techniques exist for identifying documents related to a search query. One such technique might include identifying documents that contain the search term or perhaps a synonym of the search term. When the search query includes more than one search term, then a technique might include identifying documents that contain the search terms as a phrase, that contain the search terms but not necessarily together, or that contain less than all of the search terms. Yet other techniques are known to those skilled in the art. In one implementation, the search engine may identify 1,000 or more documents that relate to the search query.

The union of the (attribute, value) pairs across the identified set of documents (or a subset of the identified set of documents) may be determined (act 730). The (attribute, value) pairs for the documents may be identified and retrieved from computer-readable medium 600 based on document identification information associated with the documents in the identified set. For example, assume that a document in the set of identified documents has a document identifier of ABC. Therefore, all of the (attribute, value) pairs in computer-readable medium 600 that are associated with document identifier ABC would be retrieved.

In one implementation, duplicate (attribute, value) pairs may be eliminated when the duplicate pairs are obtained from related documents. For example, if the same (attribute, value) pairs are obtained from documents relating to the same organization (e.g., cnet.co.uk and cnet.com may be treated as a single source), the duplicate (attribute, value) pairs may be treated as a single (attribute, value) pair.

(Attributes, value) pairs may be selected as candidate (attribute, value) pairs to provide to the user (act 740). In one implementation, the (attribute, value) pairs that are selected as candidates may be based on a threshold. For example, if more than a threshold number of documents in the identified set of documents include a particular attribute and agree that the particular attribute is associated with a particular value, that (attribute, value) pair may be identified as a candidate for providing to the user. In one implementation consistent with the principles of the invention, the threshold may be set to three. Therefore, in this situation, if three or more documents in the identified set agree that a particular attribute has a particular value, then that (attribute, value) pair may be considered as trustworthy and may thus be considered as a candidate (attribute, value) pair for providing to the user.

The accuracy of the candidate (attribute, value) pairs may be reinforced against the document in the set of identified documents that includes the greatest number of candidate (attribute, value) pairs. The candidate (attribute, value) pairs may then be re-evaluated based on the reinforcements. For example, those candidate (attribute, value) pairs that conflict with the (attribute, value) pairs in the document that includes the greatest number of candidate (attribute, value) pairs may be discarded. Moreover, since the document that includes the greatest number of candidate (attribute, value) pairs may be considered trustworthy, the list of candidate (attribute, value) pairs may be supplemented with one or more (attribute, value) pairs that are in that document (and that are not already in the list of candidate (attribute, value) pairs).

The above reinforcement and re-evaluation may continue until the number of (attribute, value) pairs in the list of candidate (attribute, value) pairs stops growing. The remaining list of (attribute, value) pairs may be considered a final list to be provided to the user. It will be appreciated that other techniques for obtaining a final list of (attribute, value) pairs to provide to the user can alternatively be used. For example, other techniques can be used to evaluate the potential accuracy and/or relevancy of (attribute, value) pairs, and thus to select the final list of (attribute, value) pairs to be presented to the user.

The final list of (attribute, value) pairs may be provided to the user via a graphical user interface, along with a list of search results relating to the user's search query (act 750). In one implementation, the final list of (attribute, value) pairs may be provided above the list of search results on the graphical user interface, as illustrated in exemplary graphical user interface 100 in FIG. 1. The final list of (attribute, value) pairs may be provided in a format that facilitates review of the information by the user. For example, in one implementation, the final list of (attribute, value) pairs may be provided in a table format, with one column of the table including the attribute names and another column including the attribute values.

In addition to the final list of (attribute, value) pairs, one or more links may be provided with each (attribute, value) pair. When clicked, the link may cause a publicly-available document to be provided to the user that includes or supports the information provided by the (attribute, value) pair with which the link is associated. The number of links provided for an (attribute, value) pair may be limited. For example, in one implementation, five or fewer links may be provided for any (attribute, value) pair. In one implementation consistent with the principles of the invention, selection of the links to be provided in the graphical user interface may be based on the number of (attribute, value) pairs in the documents with which the links are associated. For example, those documents including the (attribute, value) pair and including the greatest number of (attribute, value) pairs from the final list of (attribute, value) pairs may be selected to be provided with the (attribute, value) pair. When more than one link is provided for an (attribute, value) pair, the links may be sorted based on the number of (attribute, value) pairs from the final list of (attribute, value) pairs in the documents with which the links are associated. Other techniques can also be used to evaluate and select the links to be provided for each (attribute, value) pair.

Figure 8:
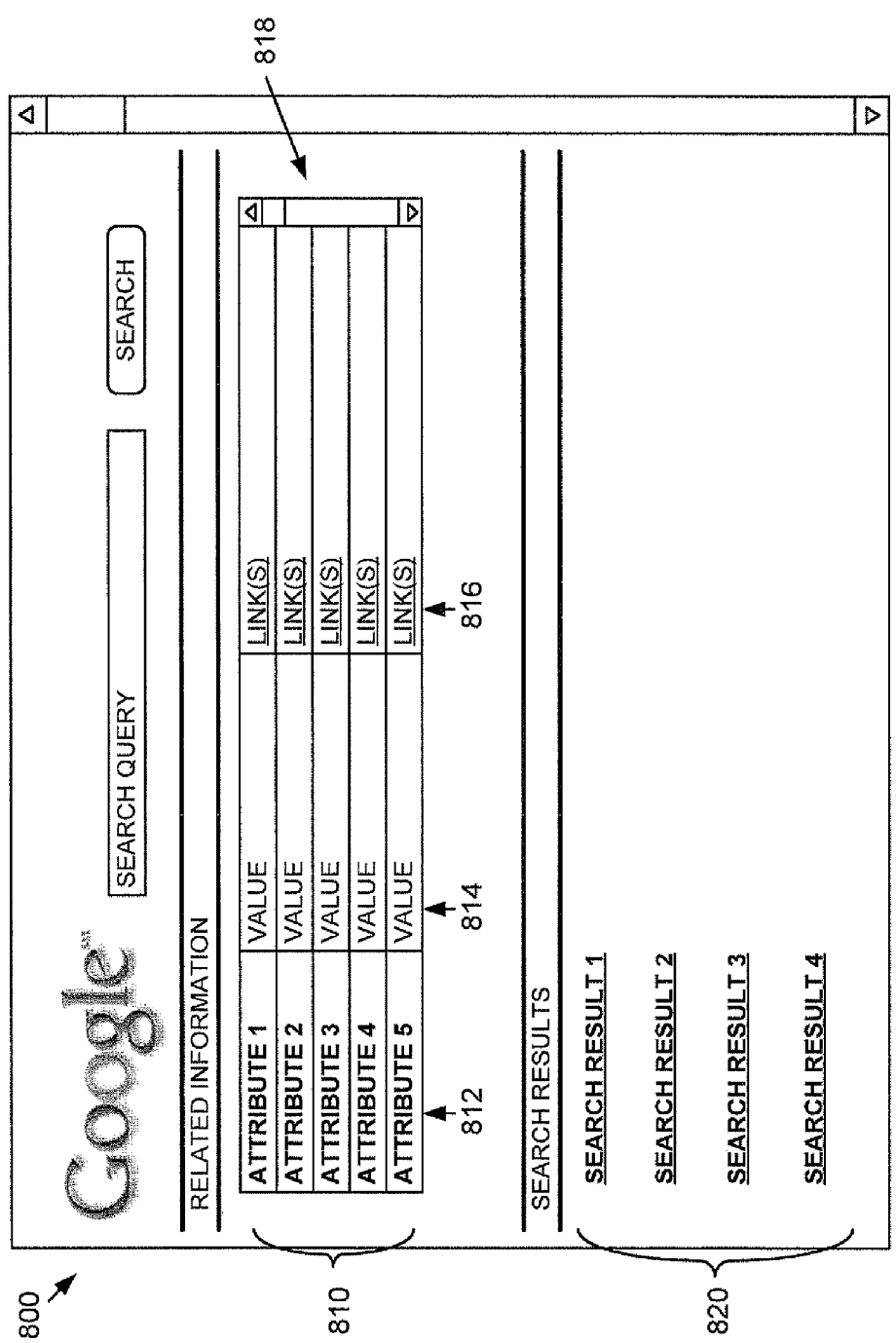
FIG. 8 is an exemplary format of a graphical user interface that may be provided to a user in an implementation consistent with the principles of the invention.

FIG. 8 is an exemplary format of a graphical user interface 800 that may be provided to a user in an implementation consistent with the principles of the invention. As illustrated, graphical user interface 800 may provide a related information section 810 and a search results section 820. Search results section 820 may provide a list of search results relating to the search query. Related information section 810 may provide additional information relating to the search query. As illustrated, related information section 810 may include a three-column table, where left-most column 812 includes the attribute name, middle column 814 includes the attribute value, and right-most column 816 includes one or more links. The attribute name, value, and link information may alternatively be provided in other formats.

The size of related information section 810 may be limited so as not to take away from the results provided in search results section 820. In one implementation consistent with the principles of the invention, the amount of screen real estate used by related information section 810 is less than the amount of screen real estate used by the search results section 820. In this implementation, the related information table may include a scroll bar 818 to allow for a greater amount of related information to be provided to the user. That is, instead of limiting the number of (attribute, value) pairs and links that are provided to the user, scroll bar 818 allows for an unlimited number of (attribute, value) pairs and links to be provided.

The following example illustrates the above processing. Assume, for explanatory purposes, that a user enters the search query "Company A" into a search engine. In response, the search engine may identify documents relating to the search query in a well-known manner. The (attribute, value) pairs that are included in the identified documents may be retrieved from a computer-readable medium, such as computer-readable medium 600 (FIG. 6), with duplicate (attribute, value) pairs from documents associated with the same source being eliminated. A candidate list of (attribute, value) pairs may be obtained by, for example, determining whether the number of occurrences of each (attribute, value) pair in different documents exceeds a threshold. The candidate list of (attribute, value) pairs may be refined until a final list of (attribute, value) pairs is obtained, as described above with respect to FIG. 7.

Thereafter, the final list of (attribute, value) pairs may be provided to the user in addition to a list of search results relating to the search query. FIG. 9 is an exemplary graphical user interface 900 that may be provided to a user in response to a search for "Company A." As illustrated, graphical user interface 900 may provide a list of documents relating to Company A in search results section 920. In addition, graphical user interface 900 may provide additional information about Company A. For example, as illustrated in FIG. 9, related information section 910 may include the following (attribute, value) pairs: (name; Company A), (date of incorp; Dec. 2, 1981), (founders; Jack Smith, Bob Wei), (product line; widgets), and (2006 revenue; $1,000,000). Each (attribute, value) pair may be associated with one or more links. For example, as illustrated in FIG. 9, the attribute "name" is associated with the links "www.companya.com" and "www.tcus.org." Additional information relating to Company A may also be provided in related information section 910 and may be accessible to the user via a scroll bar that is associated with related information section 910.

Implementations consistent with the principles of the invention augment search results with information that is extracted and correlated across multiple, publicly-available, documents. By providing information that may be of interest to a user in response to the user performing a search, the information needs of the user can be met without requiring the user to sort through search results for the information that is desired.

CONCLUSION

Implementations consistent with the principles of the invention improve network searching by augmenting search results with publicly-available information that may be interest to the user.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, one or more of the acts described with respect to FIGS. 4 and 7 may be performed by server 120 or another device (or combination of devices). In one implementation, one or more of the acts described with respect to FIGS. 4 and 7 may be performed by a client 110 or a server, such as one of servers 130. In addition, a browser assistant (i.e., client-based software that operates in conjunction with a conventional web browser) may perform one or more of the acts described with respect to the processing of FIGS. 4 and 7.

While series of acts have been described with regard to FIGS. 4 and 7, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by one or more processors, a search query;
identifying, by the one or more processors and based on the search query, a plurality of documents relating to the search query;
analyzing, by the one or more processors, a set of the plurality of documents to obtain information from each document of the set of the plurality of documents, the information being associated with an attribute, and the information including a value that corresponds to the attribute;
determining, by the one or more processors and based on analyzing the set of the plurality of documents, that a document, of the set of the plurality of documents, includes first information from content of the document, the first information being associated with the attribute and the value; and
providing, by the one or more processors, a web page that includes a first user interface section and a second user interface section, the first user interface section including a link to at least one document of the plurality of documents, and the second user interface section including the first information.

2. The method of claim 1, where the first user interface section includes a plurality of links, and the second user interface section is located above at least one link of the plurality of links.

3. The method of claim 1, where the first user interface is provided in a first portion of the web page, and the second user interface is provided in a second portion of the web page, the second portion being located above the first portion.

4. The method of claim 1, where the second user interface section is associated with a scroll feature.

5. The method of claim 1, where the first information includes a pair of values, and the method further includes:
determining that another document, of the set of the plurality of documents, includes the pair of values; and
storing information associating the document with the pair of values and the other document with the pair of values.

6. The method of claim 1, where the first information is provided in a first format, and the method further includes:
determining that another document, of the set of the plurality of documents, includes second information, the second information being provided in a second format;
normalizing the first information and the second information to create normalized information; and
storing the normalized information.

7. The method of claim 1, further comprising:
determining that another document, of the set of the plurality of documents, includes the first information, where, when providing the second user interface section, the method includes: providing the second user interface section based on determining that the other document includes the first information.

8. A device comprising:
a memory to store instructions; and
a processor to execute the instructions to:
receive a search query;
identify, based on the search query, documents relating to the search query;
analyze a plurality of the documents to obtain information from each document of the plurality of the documents, the information being associated with a plurality of attributes, and the information including a plurality of values, wherein each of the plurality of values corresponds to one of the plurality of attributes;
determine, based on analyzing the plurality of the documents, that a first document, of the plurality of the documents, includes first information and a second document, of the plurality of the documents, includes second information, the first information being associated with a first attribute, of the plurality of attributes, and a first value of the plurality of values, and the second information being associated with a second attribute, of the plurality of attributes, and a second value of the plurality of values; and
provide a web page that includes a first user interface section and a second user interface section, the first user interface section including a link to at least one of the documents, and the second user interface section including the first information and the second information.

9. The device of claim 8, where the processor is further to:
determine that a set of the plurality of the documents include the first information;
determine that the set of the plurality of the documents are related; and
process, based on determining that the set of the plurality of the documents are related, the plurality of the documents.

10. The device of claim 8, where the first information includes a plurality of types of information, and the second user interface section includes a quantity of links to respective documents, the quantity of the links being determined based on a quantity of the plurality of types of information included in each document of the respective documents.

11. The device of claim 8, where the second user interface section includes a quantity of links to respective documents, the quantity of the links being determined based on a quantity of the plurality of types of information included in each document of the respective documents.

12. The device of claim 8, where the second user interface section is associated with a scroll feature.

13. The device of claim 8, where the first information is provided in a first format, and the processor is further to:
determine that another document, of the plurality of the documents, includes the second information, the second information being provided in a second format;
normalize the first information and the second information to create normalized information; and
store the normalized information.

14. The device of claim 8, where the processor is further to:
determine that another document, of the plurality of the documents, includes the first information, and
the processor, when providing the second user interface section, is further to:
provide the second user interface section based on determining that the other document includes the first information.

15. A non-transitory computer-readable medium storing instructions, the instructions comprising:
one or more instructions which, when executed by a processor, cause the processor to:
receive a search query;
identify, based on the search query, documents relating to the search query;
analyze a plurality of the documents to obtain information from each document of the plurality of the documents, the information being associated with a plurality of attributes, and the information including a plurality of values wherein each of the plurality of values corresponds to one of the plurality of attributes;
determine, based on analyzing the plurality of the documents, that a first document, of the plurality of the documents, includes first information and a second document, of the plurality of the documents, includes second information, the first information being associated with a first attribute, of the plurality of attributes, and a first value of the plurality of values, and the second information being associated with a second attribute, of the plurality of attributes, and a second value of the plurality of values; and
provide a web page that includes a first user interface section and a second user interface section, the second user interface section including the first information and the second information.

16. The non-transitory computer-readable medium of claim 15, where the first information includes a pair of values, and the instructions further include:
one or more instructions to determine that another document, of the plurality of the documents, includes the pair of values; and
one or more instructions to store information associating the document with the pair of values and the other document with the pair of values.

17. The non-transitory computer-readable medium of claim 15, where the first user interface section includes a plurality of links, and the second user interface section is located above at least one link of the plurality of links.

18. The non-transitory computer-readable medium of claim 15, where the first information is provided in a first format, and the instructions further include:
one or more instructions to determine that another document, of the plurality of the documents, includes second information, the second information being provided in a second format;
one or more instructions to normalize the first information and the second information to create normalized information; and
one or more instructions to store the normalized information.

19. The non-transitory computer-readable medium of claim 15, where the first information includes a plurality of types of information, and the second user interface section includes a quantity of links to respective documents, the quantity of the links being determined based on a quantity of the plurality of types of information included in each document of the respective documents.

20. The non-transitory computer-readable medium of claim 15, where the instructions further include:
one or more instructions to determine that another document, of the plurality of the documents, includes the first information, where the one or more instructions to provide the second user interface section include: one or more instructions to provide the second user interface section based on determining that the other document includes the first information.

* * * * *